United States Patent [19]

Nakagawa

[11] Patent Number: 4,527,263
[45] Date of Patent: Jul. 2, 1985

[54] ECCENTRICITY CORRECTION FOR AN OPTICAL DISK DEVICE

[75] Inventor: Akira Nakagawa, Yokohama, Japan
[73] Assignee: Tokyo Shibaura Denki Kabushiki Kaisha, Kawasaki, Japan
[21] Appl. No.: 394,305
[22] Filed: Jul. 1, 1982
[30] Foreign Application Priority Data
  Jul. 7, 1981 [JP] Japan ............................ 56-105935
[51] Int. Cl.³ ............................................. G11B 7/00
[52] U.S. Cl. ...................................... 369/46; 369/111
[58] Field of Search ..................... 358/342; 369/44, 45, 369/46, 111, 50, 51

[56] References Cited

U.S. PATENT DOCUMENTS

4,138,741 2/1979 Hedlund et al. ................ 369/44 X
4,205,338 5/1980 Schaefer ............................ 358/342
4,365,324 12/1982 Michaelis ....................... 369/44 X

*Primary Examiner*—Donald McElheny, Jr.
*Attorney, Agent, or Firm*—Cushman, Darby and Cushman

[57] ABSTRACT

An optical disk device which has a memory circuit for storing an eccentric displacement for one revolution of an optical disk. The memory circuit receives a signal from an eccentric displacement detector which detects the eccentric displacement of the optical disk on the basis of an optical signal from an optical head. In the recording and reproducing modes, the position of the optical head is controlled to compensate for the eccentric displacement on the basis of the eccentric displacement data stored in the memory circuit.

4 Claims, 22 Drawing Figures

ECCENTRICITY CORRECTION FOR AN OPTICAL DISK DEVICE

BACKGROUND OF THE INVENTION

The present invention relates to an optical disk device for recording data on an optical disk or reproducing it therefrom by causing an optical head to track along the optical disk and, more particularly, to an optical disk device wherein stability of tracking control is improved.

Data retrieval devices have been recently developed and are commercially available which store image data such as documents, which are increasingly handled, on a data file device (e.g., an optical disk recording device) and which retrieve desired image data among various pieces of image data stored in the file device as needed.

In an optical disk device used as the data file device, a document surface to be stored is optically scanned with laser beams and black-and-white data on the document surface is converted to an electric signal (analog signal). The electric signal is then FM modulated to form a record signal. With the record signal, the laser beams are on-off modulated. The modulated laser beams are radiated on an optical disk (rotated at a constant speed) comprising a glass disk and a metal layer deposited thereon. Upon radiation of the laser beams, the metal layer is melted and deformed in accordance with the modulated contents of the laser beams to form pits. Data is stored in the form of a series of pits which form a track with rotation of the optical disk.

For reading out data recorded on the optical disk, the optical disk is rotated at a constant speed. The laser beams are radiated along a data recording track on the rotating disk for scanning. As a result, modulated reflected light beams are obtained in accordance with the arrangement of the pits formed on the optical disk. The reflected light beams are photoelectrically converted to reproduce data recorded on the disk.

In the optical disk device of this type, for recording data on the optical disk or reproducing it therefrom, the data recording tracks on the rotating optical disk must be properly traced and scanned with the laser beams. The following device is used to trace the data recording tracks.

The device has a photoelectric transducer having a pair of light-receiving elements arranged along the radial direction of the optical disk. Two outputs from the photoelectric transducer are compared in a differential amplifier to obtain a tracking error signal. The tracking error signal is divided into a high frequency component and a low frequency component by a servo circuit. The servo circuit drives a linear motor in accordance with the low frequency component and drives a galvanomirror in accordance with the high frequency component. Thus, tracking is performed.

However, the servo circuit described above requires two servo loops, the stability of which is liable to be affected by the amount of eccentric displacement. Further, the arrangement of the servo circuit is complex.

SUMMARY OF THE INVENTION

It is, therefore, an object of the present invention to provide an optical disk device whose tracking control stability is improved.

It is another object of the present invention to provide an optical disk device which controls the tracking operation in a stable manner with a simple servo circuit.

These and other objects have been attained by the optical disk device which comprises: optical head means for linearly moving along the radial direction of a rotating optical disk placed on a turntable and having at least one circular recording track and for recording and reproducing data along said at least one circular recording track, using laser beams; one-revolution detecting means for detecting one revolution of the optical disk; pulse generating means for generating a plurality of pulses at equal time intervals corresponding to first predetermined equal angular intervals upon one revolution of the optical disk; eccentric displacement detecting means for detecting an eccentric displacement of the optical disk from an optical signal from said optical head means and for generating eccentric displacement compensating data; memory means, connected to said eccentric displacement detecting means, said one-revolution detecting means and said pulse generating means, for storing the eccentric displacement compensating data for one revolution of the optical disk in correspondence with second predetermined equal angular intervals of the optical disk on the basis of the plurality of pulses from said pulse generating means and a signal from said one-revolution detecting means; and driving means, connected to said memory means, for controlling a position of said optical head means to compensate for the eccentric displacement of the optical disk in accordance with the eccentric displacement compensating data from said memory means in correspondence with the second predetermined equal angular intervals of the optical disk when data is recorded on the optical disk or reproduced therefrom.

In the optical disk device according to the present invention, the eccentric displacement compensating data for one revolution of the optical disk is digitally stored in advance. When data is recorded on the optical disk or reproduced thereon, the position of the optical head is controlled in accordance with the eccentric displacement compensating data. Therefore, the optical disk device of the present invention requires only one servo loop (closed loop) for controlling the galvanomirror, so that stability of tracking control is improved. Further, the servo circuit consists only of the galvanomirror and associated circuits, so that the configuration of the servo circuit becomes simple.

BRIEF DESCRIPTION OF THE DRAWINGS

By way of example and to make the description clearer, reference is made to the accompanying drawings in which.

DETAILED DESCRIPTION OF THE PREFERRED EMBODIMENT

Figure 1:
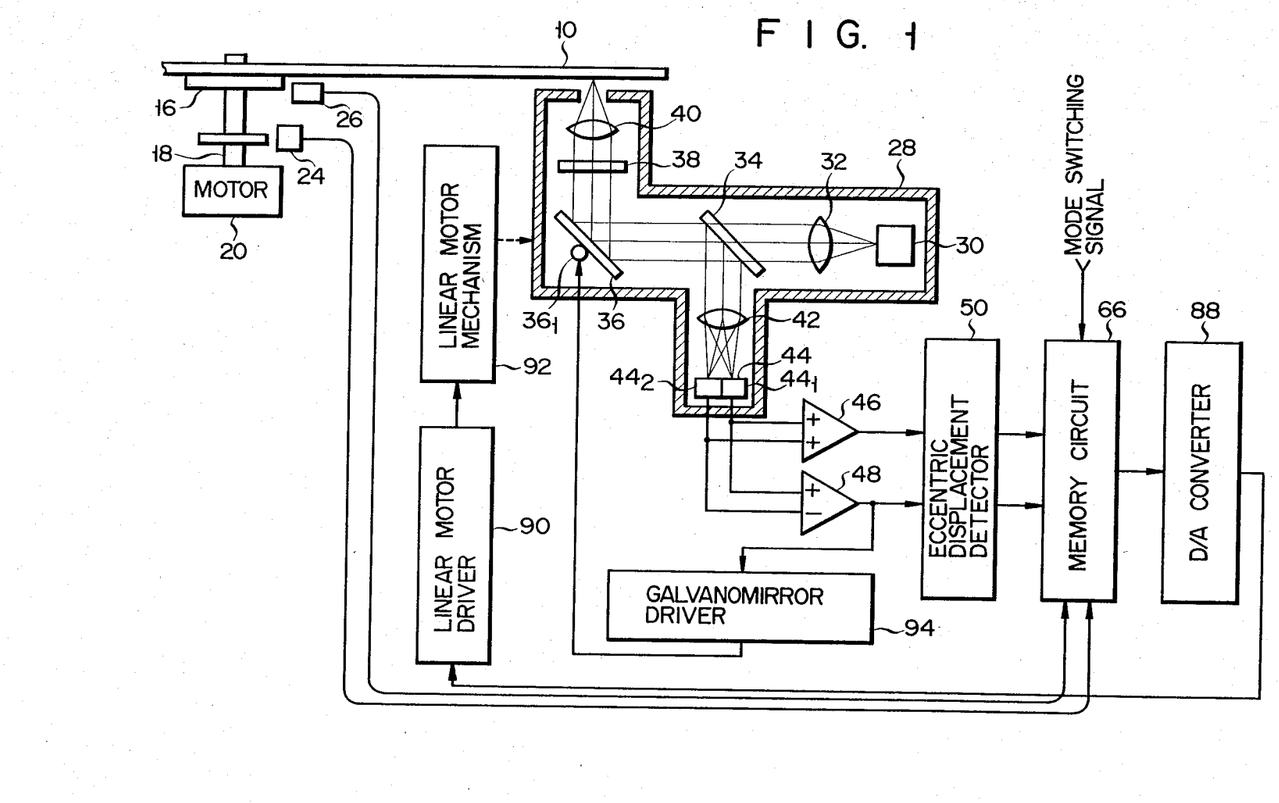
FIG. 1 is a schematic block diagram showing the overall arrangement of an optical disk device according to one embodiment of the present invention.
Figure 2:
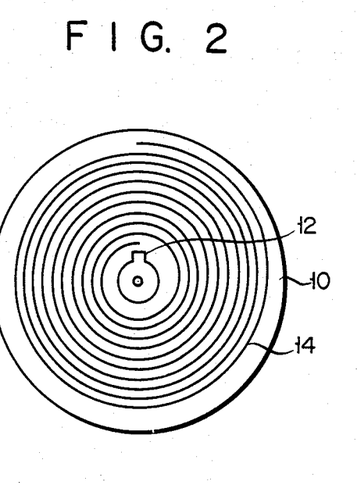
FIGS. 2 and 3 are schematic plan views of the optical disk in FIG. 1.
Figure 3:
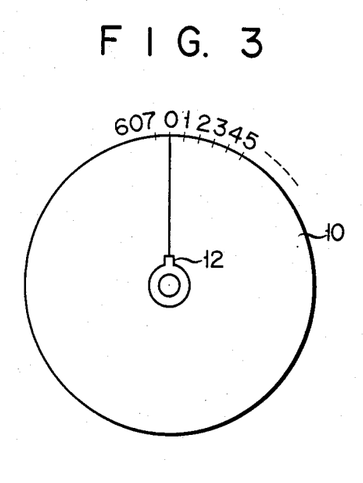
Figure 4:
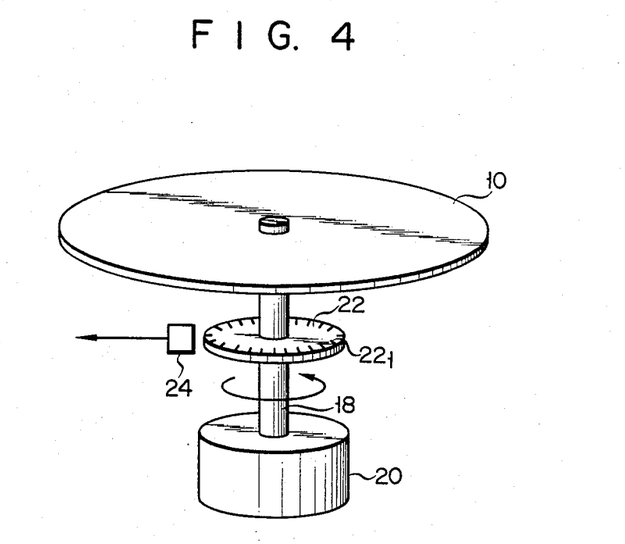
FIG. 4 is a perspective view of a position detector and associated parts shown in FIG. 1.

An optical disk device according to one embodiment of the present invention will be described in detail with reference to the accompanying drawings. FIG. 1 is a schematic block diagram showing the overall arrangement of an optical disk device according to the present invention. The area of the optical disk corresponding to one revolution is divided into 608 blocks. An eccentric displacement of each block is stored. For recording data on the optical disk or reproducing it therefrom, a linear motor is driven in accordance with the eccentric displacement to trace a predetermined track with the optical head. A displacement which cannot be compensated for by the linear motor is compensated for by pivoting a galvanomirror. An optical disk 10 comprises a disk-shaped substrate of glass or a plastic, as shown in FIG. 2. A metal layer made of tellurium or bismuth is formed on the disk-shaped substrate. A notch is formed as a reference position mark 12 in the vicinity of the center of the metal layer. Groove-shaped tracks 14 are spirally (or concentrically) preformed on the surface of the optical disk 10. The optical disk 10 is divided into 608 blocks, starting from the reference mark 12 as 0 to 607 in the clockwise direction, as shown in FIG. 3. The optical disk 10 is fixed on a turntable 16. The turntable 16 is coupled to a motor 20 through a rotating shaft 18 and is driven by the motor 20. A disk-shaped plate 22 for generating timing signals is mounted on the rotating shaft 18. Seventy-six marks $22_1$ for generating signals are formed at equal angular intervals on the disk plate 22, as shown in FIG. 4. A position detector 24 optically detects the marks $22_1$ on the disk-shaped plate 22, and generates seventy-six pulses for one revolution of the disk-shaped plate 22.

A reference position detector 26 is arranged in the vicinity of the turntable 16 and under the optical disk 10. The reference position detector 26 detects the reference position mark 12 on the optical disk 10. The reference position detector 26 comprises a known photodetector consisting of a light-emitting element and a light-receiving element.

An optical head 28 for recording data on the optical disk 10 and reproducing it therefrom is radially movably arranged along the surface of the optical disk 10. The optical head 28 comprises a semiconductor laser oscillator 30 for generating laser beams, a collimating lens 32, a half mirror 34, a galvanomirror 36, a quarter-wave plate 38, an objective lens 40, a convex lens 42, and a two-element photoelectric sensor 44. The two-element photoelectric sensor 44 comprises light-receiving elements $44_1$ and $44_2$ which receives light beams reflected by the optical disk 10 and photoelectrically converts the reflected light beams to electric signals. The electric signals output from the light-receiving elements $44_1$ and $44_2$ are supplied to an adder 46 and simultaneously to a differential amplifier 48. Output signals from the adder 46 and the differential amplifier 48 respectively are supplied to an eccentric displacement detector 50.

Figure 5:
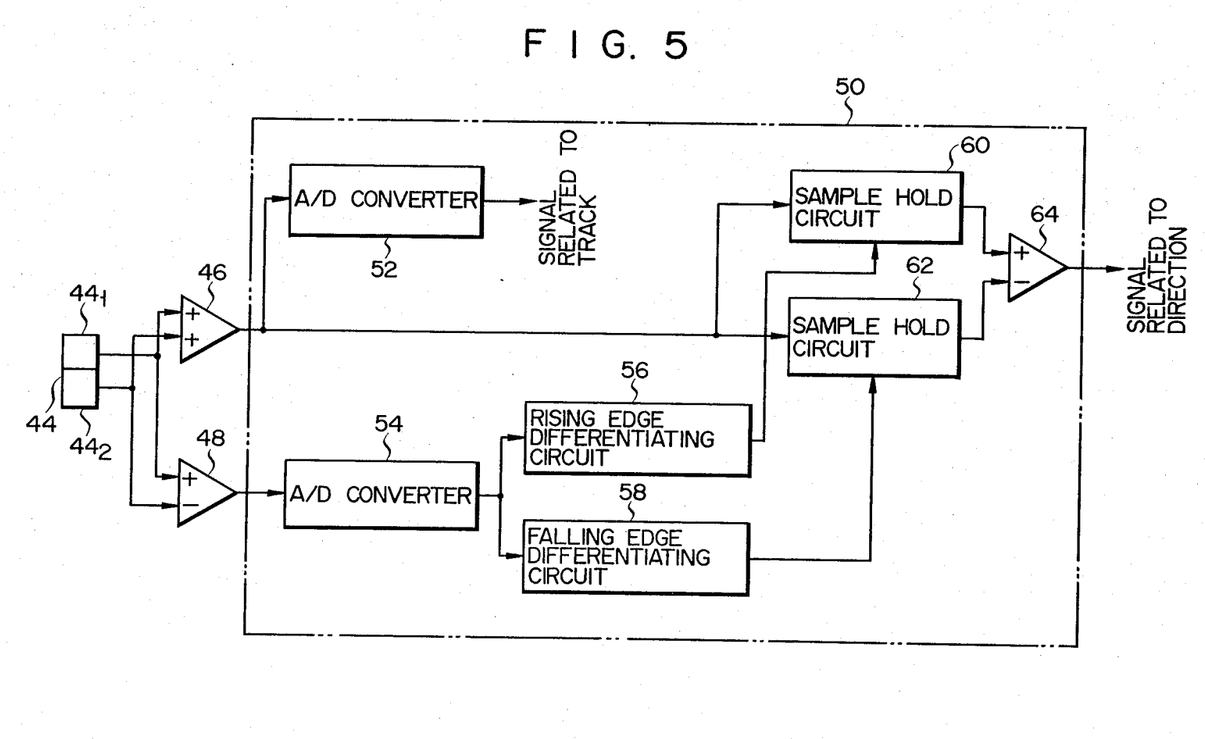
FIG. 5 is a schematic block diagram of an eccentric displacement detector in FIG. 1.

The eccentric displacement detector 50 detects a signal corresponding to a track (groove) of the optical disk 10 which is scanned with the optical head 28 and a signal corresponding to a scanning direction thereof in response to the outputs from the adder 46 and the differential amplifier 48. As a result, the eccentric displacement detector 50 detects an eccentric displacement of the optical disk 10. The eccentric displacement detector 50 is arranged in a manner shown in FIG. 5. In particular, the detector 50 comprises a first A/D converter 52 for binary encoding the output from the adder 46 and for generating a signal corresponding to the track, a second A/D converter 54 for binary encoding the output from the differential amplifier 48, a rising edge differentiating circuit 56 for generating a pulse at the rising edge of the output from the second A/D converter 54, a falling edge differentiating circuit 58 for generating a pulse at the falling edge of the output from the second A/D converter 54, a first sample hold circuit 60 for sampling and holding the output from the adder 46 in accordance with an output from the rising edge differentiating circuit 56, a second sample hold circuit 62 for sampling and holding the output from the adder 46 in accordance with an output from the falling edge differentiating circuit 58, and a differential amplifier 64 for amplifying the outputs from the first and second sample hold circuits 60 and 62 and for generating a positive or negative signal representing the direction in which the optical head 28 crosses the tracks on the optical disk 10. The output from the eccentric displacement detector 50 is supplied to a memory circuit 66.

Figure 6:
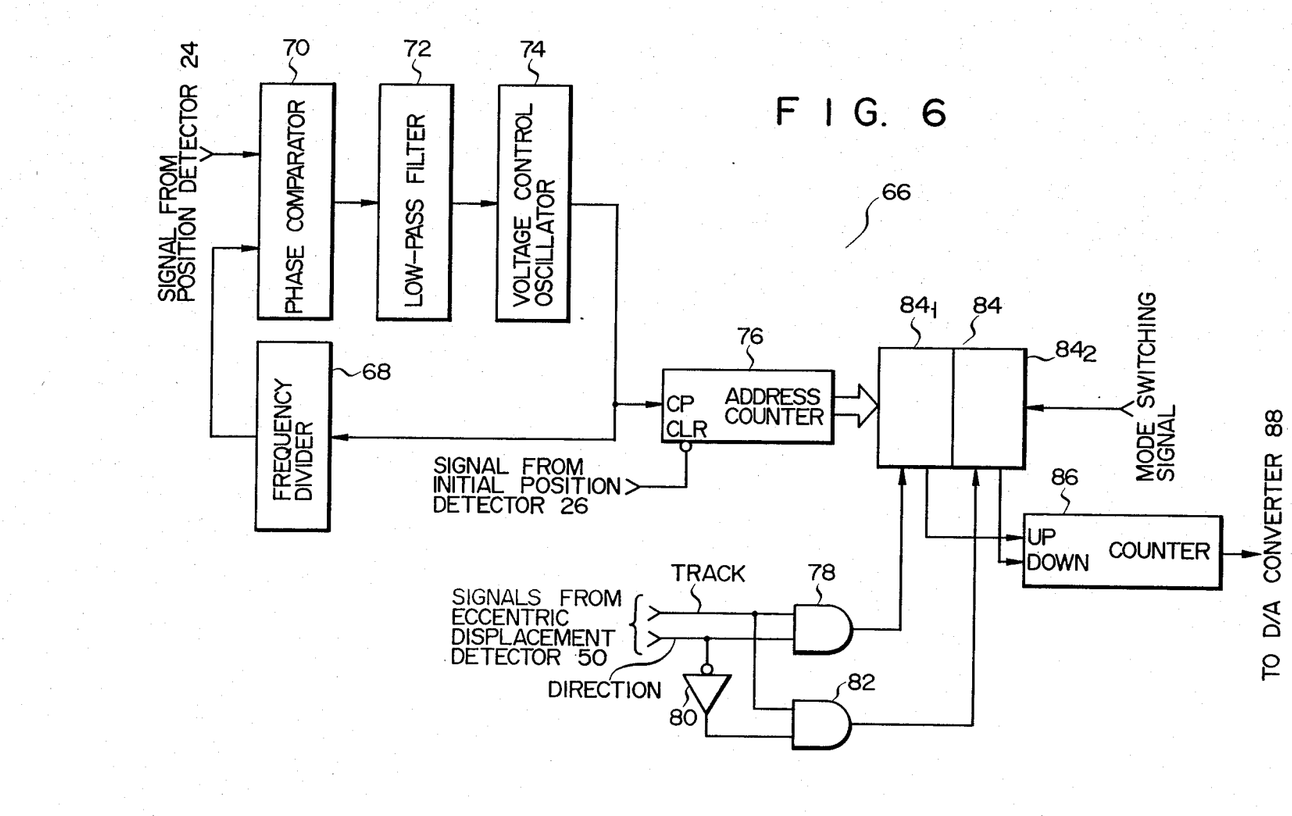
FIG. 6 is a schematic block diagram of a memory circuit in FIG. 1.

The memory circuit 66 receives outputs generated by the reference position detector 26 and the position detector 24, and a mode switching signal generated by a control circuit (not shown). In the eccentric displacement store mode, the memory circuit 66 divides a time interval into 608 blocks by the detection signal from the position detector 24. The time interval described above is a duration between reception of a reference position detection signal and reception of the next reference position detection signal by the memory circuit 66. The memory circuit 66 then stores eccentric displacement (eccentric displacement compensating data) of each block. The eccentric displacement is constituted by a signal representing the track (groove) that the optical head 28 crosses and by a signal representing the scanning direction of the optical head 28. However, in the recording and reproducing modes, the memory circuit 66 generates the eccentric displacement (eccentric displacement compensating data) stored therein in synchronism with the detection signal of the position detector 24. The memory circuit 66 is arranged in a manner as shown in FIG. 6. The memory circuit 66 comprises a phase comparator 70 which receives the output from the position detector 24 and an output from a frequency divider 68 to be described later, a low-pass filter 72 for generating only a DC component of the output of the phase comparator 70, a voltage controlled oscillator 74 for generating a signal corresponding to an output from the low-pass filter 72, the frequency divider 68 for frequency dividing an output from the voltage controlled oscillator 74, an address counter 76 which counts an output from the voltage controlled oscillator 74 and which is cleared by the signal from the reference position detector 26, a first AND circuit 78 which receives the signal from the first A/D converter 52 and the signal from the differential amplifier 64, a second AND circuit which receives the signal from the first A/D converter 52 and which also receives the signal from the differential amplifier 64 through an inverter circuit 80, a memory 84, the mode of which is switched by the mode switching signal from the control circuit (not shown), and an up/down counter 86 which counts up or down in response to an output from the memory 84. In the eccentric displacement store mode, the memory 84 stores the output (signal corresponding to the track) from the first A/D converter 52 in a memory area specified by the first and second AND circuits 78 and 82 with an address accessed by the address counter 76. Further, in the recording/reproducing mode, storage contents at an address of the memory 84 which is accessed by the address counter 76 are read out. If an eccentric displacement of the optical head 28 occurs in the direction from the center of the optical disk 10 toward the periphery thereof, a signal of level "1" is stored in an address of a memory area $84_1$ of the memory 84. However, if an eccentric displacement of the optical head occrus in the direction from the periphery of the optical disk 10 to the center thereof, a signal of level "1" is stored in an address of a memory area $84_2$. Each memory area $84_1$ or $84_2$ of the memory 84 comprises a register of 608 bits. The count of the address counter 76 corresponds to the position of each block of the optical disk 10.

An output from the memory circuit 66, that is, an output from the up/down counter 86 is supplied to a D/A converter 88. An output from the D/A converter 88 is then supplied to a linear motor driver 90. The linear motor driver 90 drives a linear motor mechanism 92 in response to the output from the D/A converter 88. The linear motor mechanism 92 causes the optical head 28 to move along the radial direction of the optical disk 10. The laser beams from the optical head 28 are radiated on a predetermined track, so that the predetermined track is scanned therewith.

The output from the differential amplifier 48 is supplied to a galvanomirror driver 94. The galvanomirror driver 94 drives a driving coil $36_1$ of the galvanomirror 36 in response to a position error signal from the differential amplifier 48. Thus, the galvanomirror 36 is pivoted so that the position error is corrected, and the accurate tracking of the optical head 28 is performed. The rotation of the galvanomirror 36 allows compensation of the displacement which cannot be compensated for by the linear motor mechanism 92 in accordance with the eccentric displacement compensating data.

The mode of operation of the optical disk device with the above arrangement will be described. When the operator turns on a power switch (not shown), the motor 20 is powered so that the optical disk 10 is rotated at a predetermined speed. The detection signal of a frequency corresponding to the rotational frequency of the motor 20 is detected by the position detector 24 and is supplied to the phase comparator 70. The output from the phase comparator 70 is supplied to the voltage controlled oscillator 74 through the low-pass filter 72. The voltage controlled oscillator 74 produces a clock pulse whose frequency is eight times that of the detection signal received by the phase comparator 70. The address counter 76 sequentially counts the pulse from the voltage controlled oscillator 74. The count of the address counter 76 is then cleared by the detection signal from the reference position detector 26.

When the operator sets the eccentric displacement store mode through a keyboard (not shown), its mode signal is supplied to the memory 84. In this condition, the optical head 28 is positioned on the predetermined track of the optical disk 10, and reproducing laser beams are generated from the semiconductor laser oscillator 30. The laser beams are then focused on the predetermined track 14 of the optical disk 10 through the objective lens 40. Beams reflected by the track 14 of the optical disk 10 are guided to the two-element photoelectric sensor 44 and are converted to electric signals. The electric signals output from the light-receiving elements $44_1$ and $44_2$ of the two-element photoelectric sensor 44 are supplied to the adder 46 and to the differential amplifier 48, respectively. The adder 46 generates a signal corresponding the sum of the output signals, while the differential amplifier 48 generates a position error signal corresponding to the difference between the output signals.

Figure 7:
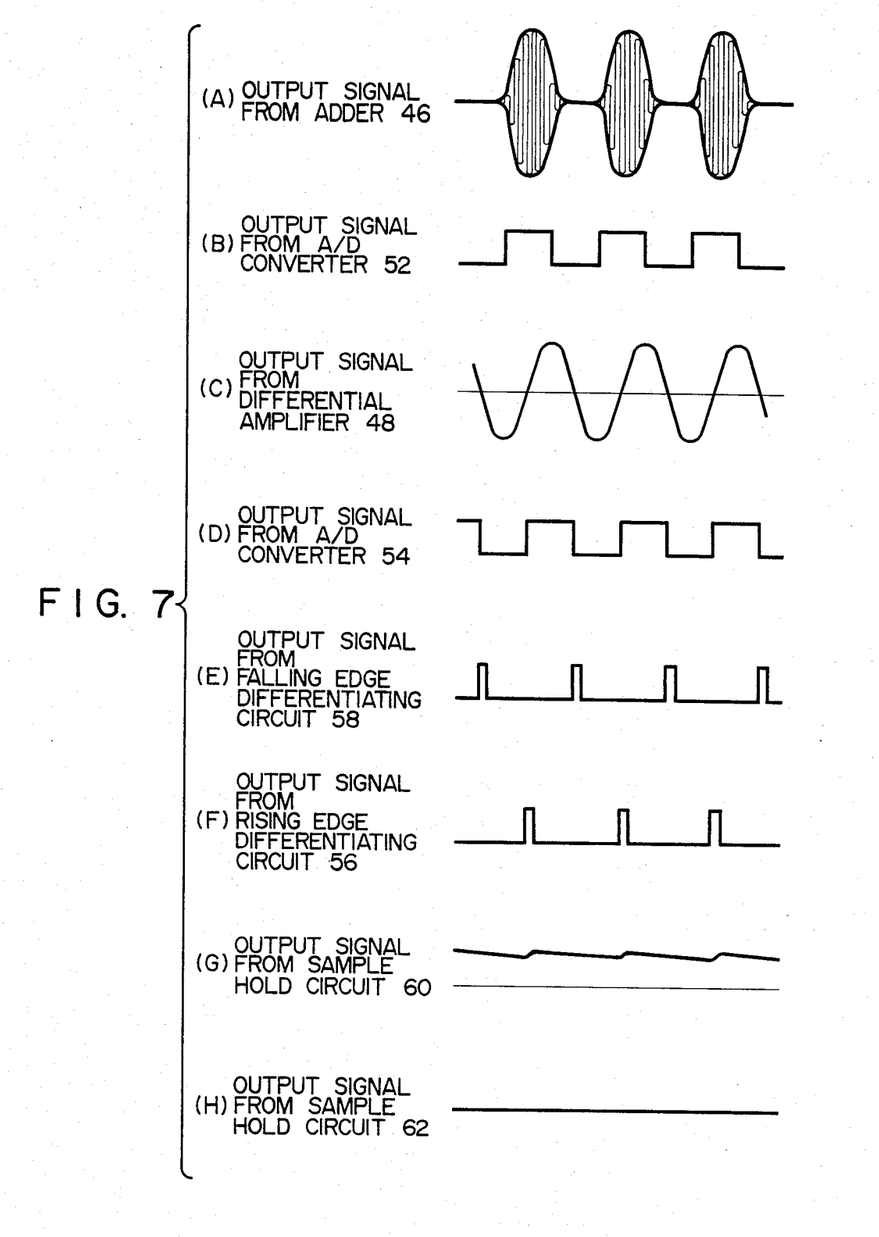
FIGS. 7A to 7H and FIGS. 8A to 8H show waveforms of signals for explaining the mode of operation of the memory circuit in FIG. 6, respectively.
Figure 8:
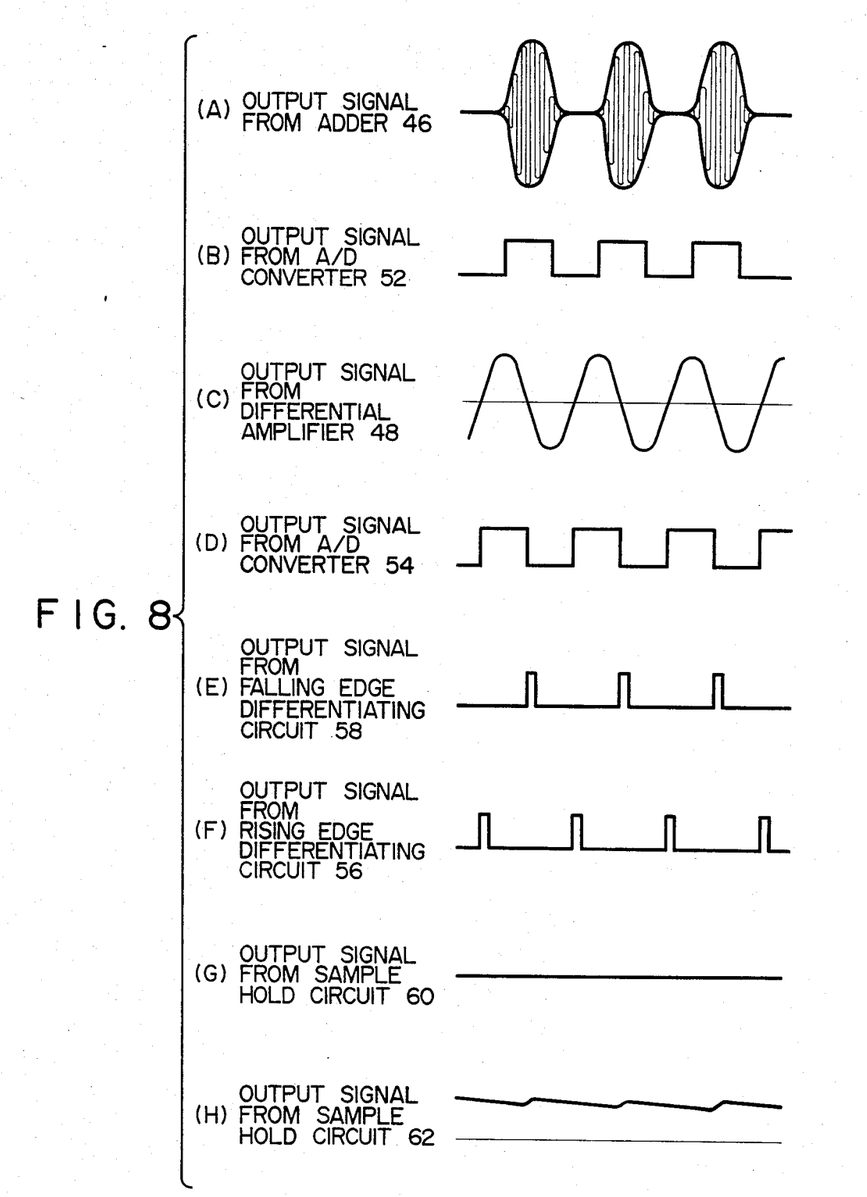

FIGS. 7A to 7H show waveforms of signals generated from the main parts of the device when the optical head 28 is eccentrically displaced from the center of the optical disk to its periphery thereof, while FIGS. 8A to 8H show waveforms of signals generated from the main parts of the device when the optical head 28 is eccentrically displaced from the periphery of the optical disk to the center thereof. The mode of operation of the optical disk device will be described with reference to FIGS. 7A to 7H and FIGS. 8A to 8H hereinbelow. The first A/D converter 52 converts the output (FIG. 7A or 8A) from the adder 46 to a binary signal. If the optical head 28 crosses the track 14, the first A/D converter 52 produces the signal of level "1" (FIG. 7B or 8B). The output (FIG. 7C or 8C) from the differential amplifier 48 is binary encoded by the second A/D converter 54 (FIG. 7D or 8D). At the rising edge of the signal from the second A/D converter 54, a pulse (FIG. 7F or 8F) is generated from the rising edge differentiating circuit 56, while a pulse (FIG. 7E or 8E) is generated from the falling edge differentiating circuit 58 at the falling edge of the signal from the second A/D converter 54. When the first sample hold circuit 60 receives the pulse from the rising edge differentiating circuit 56, it holds the output from the adder 46 as the sampling value (FIG. 7G or 8G). Similarly, when the second sample hold circuit 62 receives the pulse from the falling edge differentiating circuit 58, it holds the output from the adder 46 as the sampling value (FIG. 7H or 8H). If the optical head 28 is eccentrically displaced from the center of the optical disk 10 to the periphery thereof, the first sample hold circuit 60 holds the maximum value of the output from the adder 46, while the second sample hold circuit 62 holds the signal of level "0". However, if the optical head 28 is eccentrically displaced from the periphery of the optical disk 10 to the center thereof, the first sample hold circuit 60 holds the signal of level "0", while the second sample hold circuit 62 holds the maximum value of the output from the adder 46. Therefore, if the eccentric displacement occurs in the direction from the center of the optical disk 10 to the periphery thereof, the differential amplifier 64 generates the signal of level "1". On the other hand, if the eccentric displacement occurs in the direction from the periphery of the optical disk 10 to the center thereof, the differential amplifier 64 generates the signal of level "0".

As described above, the eccentric displacement detector 50 produces the signal corresponding to the scanning direction of the optical head 28 and the signal corresponding to the track. Eccentric displacement compensating data corresponding to the signals is stored in the memory 84. In particular, if the eccentric displacement occurs in the direction from the center of the optical disk 10 to the periphery thereof, the first AND circuit 78 is turned on. The signal of level "1" is stored in the memory area $84_1$ of the memory 84 at an address corresponding to the current count of the address counter 76. However, if the eccentric displacement occurs in the direction from the periphery of the optical disk 10 to the center thereof, the second AND circuit 82 is turned on. The signal of level "1" is then stored in the memory area $84_2$ of the memory 84 at an address corresponding to the count of the address counter 76. The above operation is repeated and the eccentric displacement compensating data for each block among the 608 blocks of the optical disk 10 is sequentially stored in the memory 84.

When the operator sets the recording mode through the keyboard (not shown), its mode signal is supplied to the memory 84. In this condition, the optical head 28 is positioned on the outermost part of the periphery of the optical disk 10 and the laser beams are generated from the semiconductor laser oscillator 30. The laser beams are focused on the outermost track 14 of the optical disk 10 through the objective lens 40. The address counter 76 counts the clock pulses generated from the voltage controlled oscillator 74 in response to the detection signal from the position detector 24. The storage contents at an address corresponding to the count of the address counter 76 are sequentially read out from the memory areas $84_1$ and $84_2$. The count of the up/down counter 86 is incremented when storage data from the memory area $84_1$ of the memory 84 is changed from data of "0" to data of "1". However, the count of the up/down counter 86 is decremented when the storage data read out from the memory area $84_2$ is changed from data of "0" to data of "1". The D/A converter 88 generates the analog signal in correspondence with the output from the memory circuit 66, that is, the count of the up/down counter 86. Thus, the linear motor driver 90 drives the linear motor mechanism 92 in accordance with the output signal from the D/A converter 88 so as to constantly scan the predetermined track with the reproduced beams generated from the optical head 28.

The laser beams reflected by the track 14 of the optical disk 10 is guided to the light-receiving elements $44_1$ and $44_2$ and are photoelectrically converted to electric signals. The electric signals are then supplied to the differential amplifier 48. The position error signal from the differential amplifier 48 causes the driving coil $36_1$ to pivot the galvanomirror 36. Thus, the eccentricl displacement of the optical head 28 is properly detected and, based on the detection result, proper tracking is performed.

In such a tracking procedure, when a pulse corresponding to recording data is supplied to a laser driver (not shown) at a predetermined timing, the recording laser beams are generated during the pulse duration. Thus, pits corresponding to recording data are formed in the grooves of the track 14.

In the reproducing mode, the optical head 28 is driven and the galvanomirror 36 is pivoted to achieve proper tracking in the same manner as in the recording mode.

The present invention is not limited to the particular embodiment. For example, in the above embodiment, the notch formed in the vicinity of the center of the metal layer of the optical disk 10 is used as the reference position mark 12. However, a projection in the vicinity of the center of the metal layer may be used for this purpose. Alternatively, a mark in the vicinity of the center which is spaced apart from the metal layer may also be used for this purpose. In summary, the reference position mark need only indicate one revolution of the optical disk 10.

Various changes and modifications may therefore be made within the spirit and scope of the present invention.

What is claimed is:

1. An optical disk device comprising:
   a turntable for rotating an optical disk having at least one substantially circular recording track;
   optical head means, linearly movable along the radial direction of a rotating optical disk placed on said turntable for recording data on and reading data from said track using a laser beam and generating an optical head signal containing eccentric displacement information;
   revolution detecting means for detecting at least one revolution of said optical disk;
   pulse generating means for generating a plurality of pulses at equal time intervals in correspondence with first predetermined equal angular intervals of said at least one revolution of said optical disk;
   eccentric displacement detecting means for detecting from said optical head signal an eccentric displacement of said optical disk and for producing eccentric displacement compensating data indicative thereof; wherein said eccentric displacement detecting means comprises: a light-receiving unit having first and second light-receiving elements which are adjacent to each other and which receive light beams relfected by said optical disk and photoelectrically convert the light beams to electric signals, respectively; an adder, connected to said light-receiving unit, for adding the electric signals from said first and second light-receiving elements; a differential amplifier, connected to said light-receiving unit, for generating an output representing a difference between the electric signals from said first and second light-receiving elements; and an eccentric displacement detector, connected to said adder and said differential amplifier, for generating a first signal representing a recording track over which the laser beam crosses and a second signal representing a crossing direction of the laser beam in response to the outputs from said adder and said differential amplifier, said first and second signals representing eccentric displacement;
   memory means, connected to said eccentric displacement detecting means, said revolution detecting means and said pulse generating means, for storing the eccentric displacement data in correspondence with second predetermined equal angular intervals of said optical disk on the basis of the plurality of pulses from said pulse generating means and a signal from said revolution detecting means; and
   driving means, connected to said memory means, for controlling a position of said optical head means to compensate for the eccentric displacement of said disk accordance with the eccentric displacement compensating data read from said memory means in correspondence with the second predetermined equal angular intervals of said optical disk when data is recorded on the optical disk or reproduced therefrom.

2. A device according to claim 1, wherein said eccentric displacement detector comprises: a first A/D converter, connected to said adder, for binary encoding an output from said adder and for generating a digital signal corresponding to the recording track over which the laser beams cross; a second A/D converter, connected to said differential amplifier, for binary encoding the output from said differential amplifier; a rising edge differentiating circuit, connected to said second A/D converter, for generating a pulse at a rising edge of an output from said second A/D converter; a falling edge differentiating circuit, connected to said second A/D converter, for generating a pulse at a falling edge of the output from said second A/D converter; a first sample hold circuit for holding the output from said adder as a sampled value when the pulse from said rising edge differentiating circuit is supplied thereto; a second sample hold circuit, connected to said falling edge differentiating circuit, for holding the output from said adder as a sampled value when the pulse from said falling edge differentiating circuit is supplied thereto; and a differential amplifier, connected to said first and second sample hold circuits, for generating the signal representing the crossing direction of the laser beams in accordance with the sampled values from said first and second sample hold circuits.

3. An optical disk device comprising:
a turntable for rotating an optical disk having at least one substantially circular recording track;
optical head means, linearly movable along the radial direction of a rotating optical disk placed on said turntable for recording data on and reading data from said track using a laser beam and generating an optical head signal containing eccentric displacement information;
revolution detecting means for detecting at least one revolution of said optical disk;
pulse generating means for generating a plurality of pulses at equal time intervals in correspondence with first predetermined equal angular intervals of said at least one revolution of said optical disk;
eccentric displacement detecting means for detecting from said optical head signal an eccentric displacement of said optical disk and for producing eccentric displacement compensating data indicative thereof;
memory means, connected to said eccentric displacement detecting means, said revolution detecting means said pulse generating means, for storing the eccentric displacement data in correspondence with second predetermined equal angular intervals of said optical disk on the basis of the plurality of pulses from said pulse generating means and a signal from said revolution detecting means; wherein said memory means comprises: a pulse generator, connected to said pulse generating means, for generating pulses corresponding to the second predetermined angular intervals of the optical disk; a first counter, connected to said pulse generator, for counfing the pulses from said pulse generator and being cleared by a pulse from said one-revolution detecting means; and a memory circuit, which is connected to said first counter and an address of which is accessed by an output from said first counter, for storing the eccentric displacement compensating data from said eccentric displacement detecting means in correspondence with the second predetermined equal angular intervals in the recording and reproducing modes; and driving means, connected to said memory means, for controlling a position of said opfical head means to compensate for the eccentric displacement of said disk in accordance with the eccentric displacement compensafing data read from said memory means in correspondence with the second predetermined equal angular intervals of said optical disk when data is recorded on the optical disk or reproduced therefrom.

4. A device accotding to claim 3, wherein said memory circuit comprises: a memory, connected to said first counter and having first and second memory areas and, storing the eccentric displacement compensating data for the eccentric displacement from a center of said optical disk to a periphery thereof in said first memory area and for storing the eccentric displacement compensating data for the eccentric displacement from the periphery of said optical disk to the center thereof in said second memory area; a first AND gate, connected to said memory, for supplying the eccentric displacement compensating data to said first memory area; a second AND gate, connected to said memory, for supplying the eccentric displacement compensating data to said second memory area; and a second counter, connected to said memory, for generating a count signal on the basis of the eccentric displacement compensating data read out from said memory.

* * * * *